United States Patent [19]

Janssen et al.

[11] Patent Number: 4,628,385
[45] Date of Patent: Dec. 9, 1986

[54] TWO STAGE COLLETING IN A FLEXIBLE DISK DRIVE

[75] Inventors: Donovan M. Janssen; Alan J. Kirton, both of Boulder; Robert M. Murphy, Longmont; Leroy Rose, Boulder, all of Colo.

[73] Assignee: International Business Machines Corporation, Armonk, N.Y.

[21] Appl. No.: 628,633

[22] Filed: Jul. 6, 1984

[51] Int. Cl.⁴ .................. G11B 5/016; G11B 17/02
[52] U.S. Cl. ........................... 360/99; 369/270
[58] Field of Search ..................... 360/97–99; 369/270

[56] References Cited

U.S. PATENT DOCUMENTS

| | | | |
|---|---|---|---|
| 3,678,481 | 7/1972 | Dalziel et al. | 360/99 |
| 3,768,815 | 10/1973 | Mathurin | 274/40 |
| 4,125,883 | 11/1978 | Rolph | 360/99 |
| 4,193,101 | 3/1980 | Carlson et al. | 360/97 |
| 4,193,102 | 3/1980 | Beuch et al. | 360/105 |
| 4,216,510 | 8/1980 | Manzke et al. | 360/99 |
| 4,409,629 | 10/1983 | Puls | 360/99 |

OTHER PUBLICATIONS

Rusch et al, "Flexible . . . Mechanism," IBM Tech Disc Bull, vol. 22, No. 1, Jun. 1979, p. 293.
Neubauer et al, "Low . . . Drive", IBM Tech Disc Bull, vol. 20, No. 10, Mar. 1978, p. 4066.
Lightner, "Collet . . . Disk", IBM Tech Disc Bull, vol. 19, No. 6, Nov. 1976, p. 2202.
Holecek et al, "Loading . . . Disks", IBM Tech Disc Bull, vol. 21, No. 1, Jun. 1978, p. 291.

Primary Examiner—Robert S. Tupper
Attorney, Agent, or Firm—Robert E. Harris

[57] ABSTRACT

Two stage colleting is disclosed for a flexible disk drive. Precise registration of a floppy disk within a disk cartridge with respect to the spindle and recording head of a disk drive is achieved by first positioning the cartridge with respect to the collet, and then aligning the collet with respect to the spindle axis as the collet is moved toward the spindle. This two stage colleting is made possible by use of a collet shaft having two different diameters with the larger diameter being adjacent to the collet during positioning of the cartridge with respect to the collet and with the smaller diameter being adjacent to the collet to allow movement of the collet in a direction normal to the spindle axis during alignment of the collet with respect to the spindle axis.

6 Claims, 5 Drawing Figures

TWO STAGE COLLETING IN A FLEXIBLE DISK DRIVE

FIELD OF THE INVENTION

This invention relates to loading flexible disks in a flexible disk drive and, more particularly, relates to colleting in a flexible disk drive to achieve precise registration of the flexible disk with respect to the spindle of the flexible disk drive.

BACKGROUND OF THE INVENTION

Flexible disk drives, also known as floppy disk drives or diskette drives, have the capability of reading or writing magnetic signals on interchangeable flexible disks, which disks are loosely contained in a flexible envelope, or cartridge, for protection (as shown and described, for example, in U.S. Pat. No. 4,193,102). The cartridge has a central aperture through which the central aperture of the disk is exposed, and there also is a head access slot through the envelope so that a recording head can interact with the surface of the disk.

To be able to read or write information on disks interchanged between a number of disk drives, it is required that the disk be precisely registered in each drive in substantially the same position. This is accomplished by centering and clamping each disk to the spindle that rotates the disk. The spindle axis thus becomes the critical reference to which the disk is registered, and the collet, the disk cartridge, and the recording head, or heads, all have critical reference positions relative to the spindle axis.

The flexible disk is centered and clamped to the spindle by means of a collet. During the colleting operation, the collet penetrates the center aperture of the disk and then enters a recess area in the spindle. The recess in the spindle is matched to the collet so that the collet centers itself to the spindle. As a result, the collet centers the disk to the spindle. Examples of colleting apparatus are shown in U.S. Pat. Nos. 3,768,815, 4,125,883, and 4,409,629.

Typically, the collet is either slidably mounted on a shaft aligned with the spindle axis or is loosely spring mounted. Examples of the former are shown in U.S. Pat. Nos. 3,678,481 and 4,216,510, while examples of the latter are shown in U.S. Pat. Nos. 4,125,883 and 4,193,101. In both types, the collet is positioned so that its axis is substantially aligned with the spindle axis.

The disk cartridge is guided into the disk drive during insertion so that its center is substantially aligned with the spindle axis. This assures that the collet will penetrate the center aperture of the disk and the spindle recess in order to center and clamp the disk on a spindle. However, it is expensive to build the drive such that the cartridge guides and the collet axis are both substantially aligned with the spindle axis due to the number of parts required and the manual adjustments that must be made to obtain alignment with the spindle axis.

SUMMARY OF THE INVENTION

This invention provides improved colleting for a flexible disk drive by providing a two stage colleting operation. During the first stage, the cartridge is positioned relative to the collet (rather than to the spindle axis), and this assures that the collet will penetrate the center aperture of the disk. During the following stage, the collet, as it is moved into the spindle, is given a degree of freedom of movement normal to the spindle axis so that, as the collet moves into the spindle recess, it can shift laterally to align itself with the spindle axis.

To accomplish this two stage operation, the cartridge guides and rear stops are positioned relative to the axis of the collet shaft rather than to the axis of the spindle. Preferably, the guides, stops, and the shaft for the collet are molded as a single unitary structure. The shaft of the collet necks down to a smaller diameter as the collet moves down the spindle. The large diameter upper portion of the shaft thus insures that the collet will be properly positioned to penetrate the disk aperture, while the small diameter lower portion allows the collet to shift laterally relative to the collet shaft and thus the spindle axis. As the collet moves into the spindle recess, the collet centers itself and the disk to the spindle axis.

It is therefore an object of this invention to provide an improved colleting operation that simplifies structural requirements and thus reduces manufacturing costs while still assuring proper colleting of a flexible disk to the spindle in a disk drive.

With these and other objects in view, which will become apparent to one skilled in the art as the description proceeds, this invention resides in the novel construction, combination, arrangement of parts and method as hereinafter described and more particularly defined by the appended claims, it being understood that changes are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
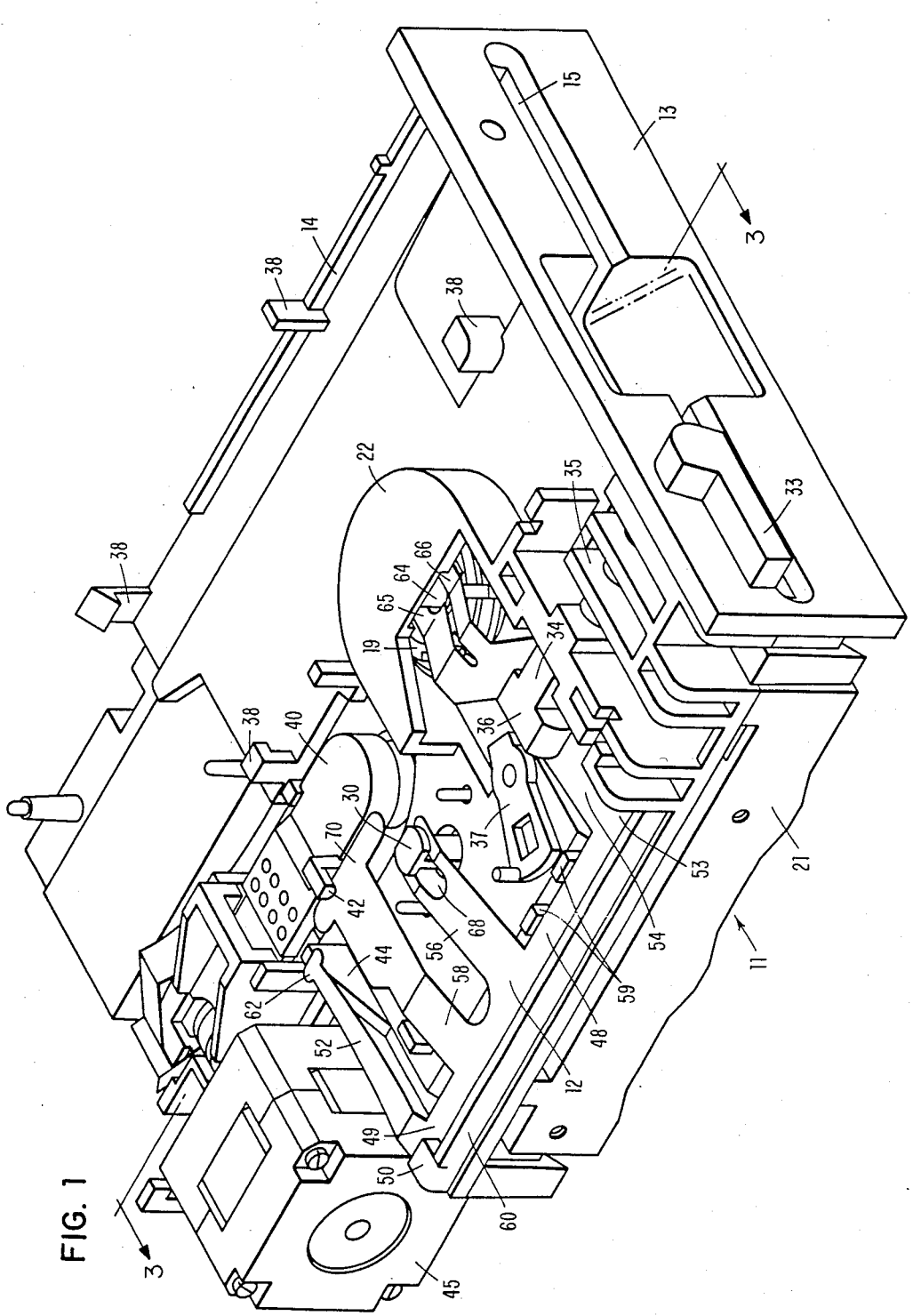
FIG. 1 is a perspective view of a flexible disk drive in which the present invention is utilized, with the disk drive being shown without a logic card at the top plate to better illustrate the invention.
Figure 2:
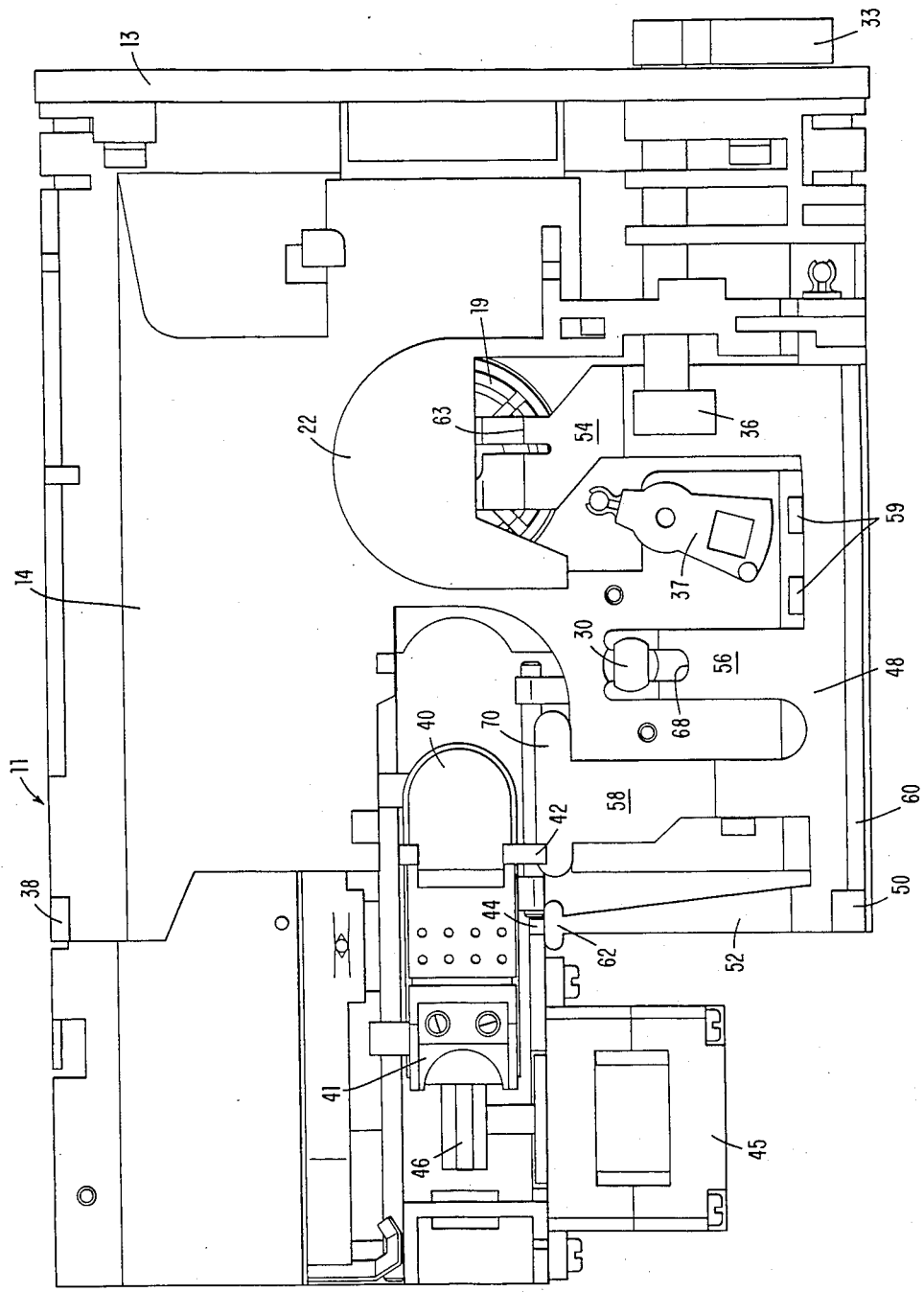
FIG. 2 is a top view of the flexible disk drive shown in FIG. 1.
Figure 3:
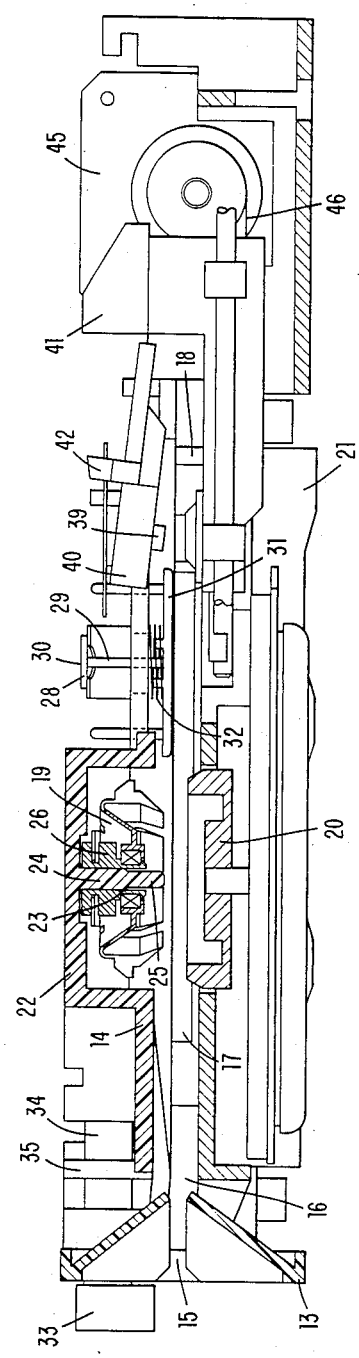
FIG. 3 is a side-sectional view taken through lines 3—3 of FIG. 1.

A flexible disk drive 11 is shown in FIGS. 1 through 3, and illustrates such a drive with the two stage colleting of this invention included therein. Flexible disk drive 11 is shown in FIGS. 1 through 3 without the logic card (a printed circuit board with electronic components thereon) that is positioned on the top of the drive and provides the electrical interfacing for the drive.

While drive 11, as particularly shown herein, is a half-high, five and one-fourth inch diskette drive, as is typically used in a personal computer, it is to be realized that the invention described herein may also be utilized in any disk drive where the disk is registered to the spindle by being colleted through a central aperture in the disk enclamped to the spindle by the collet.

As shown, flexible disk drive 11 includes an actuator 12 and a front panel 13, both of which are connected with top plate 14, with the front panel having an access slot 15 therein through which the disk envelope, with the floppy disk therein, may be inserted into passage 16 of drive 11 below top plate 14. Passage 16 (see FIG. 3) within the drive must allow free movement of the disk envelope rearwardly and forwardly during insertion and removal, respectively, of the envelope into the drive, but must also coarsely position an inserted disk envelope, which positioning is carried out by guides 17 at the opposite sides of passage 16 and rear stops 18.

It is also necessary that the floppy disk within an envelope in the disk drive be precisely positioned for proper operation, and this is accomplished by collet 19, in conjunction with spindle 20 (see FIG. 3), during loading, as is brought out more fully hereinafter.

As shown in FIGS. 1 through 3, the critical elements for loading and unloading of the flexible disk drive are positioned, or mounted, on top plate, or upper frame member 14, while the critical elements for reading and writing on flexible disks loaded into the flexible disk drive are positioned, or mounted, on lower, or main, frame member 21.

Collet 19 is mounted under raised portion 22 of top plate 14 on downwardly extending collet shaft 23 (having a larger diameter inner, or upper, portion 24 and a smaller diameter outer, or lower, portion 25) by collet pin 26 so that collet 19 is received in spindle 20 through the central aperture of a flexible disk within passage 16 during each loading operation.

Pressure pad 28 is also mounted at top plate 14 and includes a pin 29 having a head 30 at the top that extends upwardly above the top panel when assembled, a foot 31 at the bottom that extends into passage 16, and a spring 32 between foot 31 and the bottom of top plate 14 to bias the pressure pad downwardly toward the surface of a disk within passage 16.

A cam actuating handle 33 is mounted at the front end of shaft 34 just forwardly of front panel 13. Shaft 34 is rotatably mounted in vertical ribs 35 of top plate 14 and extends through an aperture in front panel 13 to receive handle 33. A cam 36 is positioned at the rear end of shaft 34 so that rotation of handle 33 controls cam actuation. In addition, a mounting bracket 37 is mounted on top plate 14 rearwardly of cam 36, to position a photodiode utilized for indexing purposes, while logic card positioning and/or retaining ears 38 are also provided for positioning the logic card (not shown).

Recording head 39 (see FIG. 3) is mounted on recording head arm 40, and arm 40 is pivoted on head carriage 41. An upwardly and outwardly extending finger 42 is mounted on recording head arm 40, and main frame 21 has an upwardly extending shoulder 44 at one side of carriage 41. Carriage 41 is mounted on main frame 21 so as to be constrained to forward and rearward movement with respect to the main frame, with such movement being controlled by stepping motor 45 through band and tensioner assembly 46, with motor 45 being also mounted on main frame 21. Stepping motor 45, in connection with band and tensioner assembly 46, steps head carriage 41 along a radial line of a flexible disk within passage 16 to maintain the recording head (upper or lower) on head carriage 41 aligned with the desired track on the disk.

Lifting and lowering of the collet, recording head arm and pressure pad are enabled through use of a single flat spring structure 12 which is referred to herein as a torsional actuator. Flat spring 12 includes a torsion beam 48 that engages the upper side of top plate 14. One end 49 of torsion beam 48 is received under lip 50 of top plate 14 and has a preload biasing, or lifting, arm 52 extending therefrom, while the other end 53 of torsion beam 48 has a collet actuating, or lifting, arm 54 extending therefrom. A pressure pad actuating, or lifting, arm 56 and a recording head actuating, or lifting, arm 58 extends from the middle portion of the torsion beam with the middle portion being restrained against movement by ears 59 and side rail 60. The torsion beam and all of the lifting arms of the actuator are bendable beams which are preferably constructed of thin metal, such as stainless steel, to form a unitary flat spring.

The free end 62 of preload biasing arm 52 engages the top of shoulder 44 to provide a bias to the actuator when the device is in the assembled condition. Collet actuating arm 54 has a V-shaped portion 63 for adaption of the arm to the collet, and a notch 64, formed from legs 65 and 66, extends inwardly from the end of the arm so that collet pin 26 is received in the notch.

Figure 4:
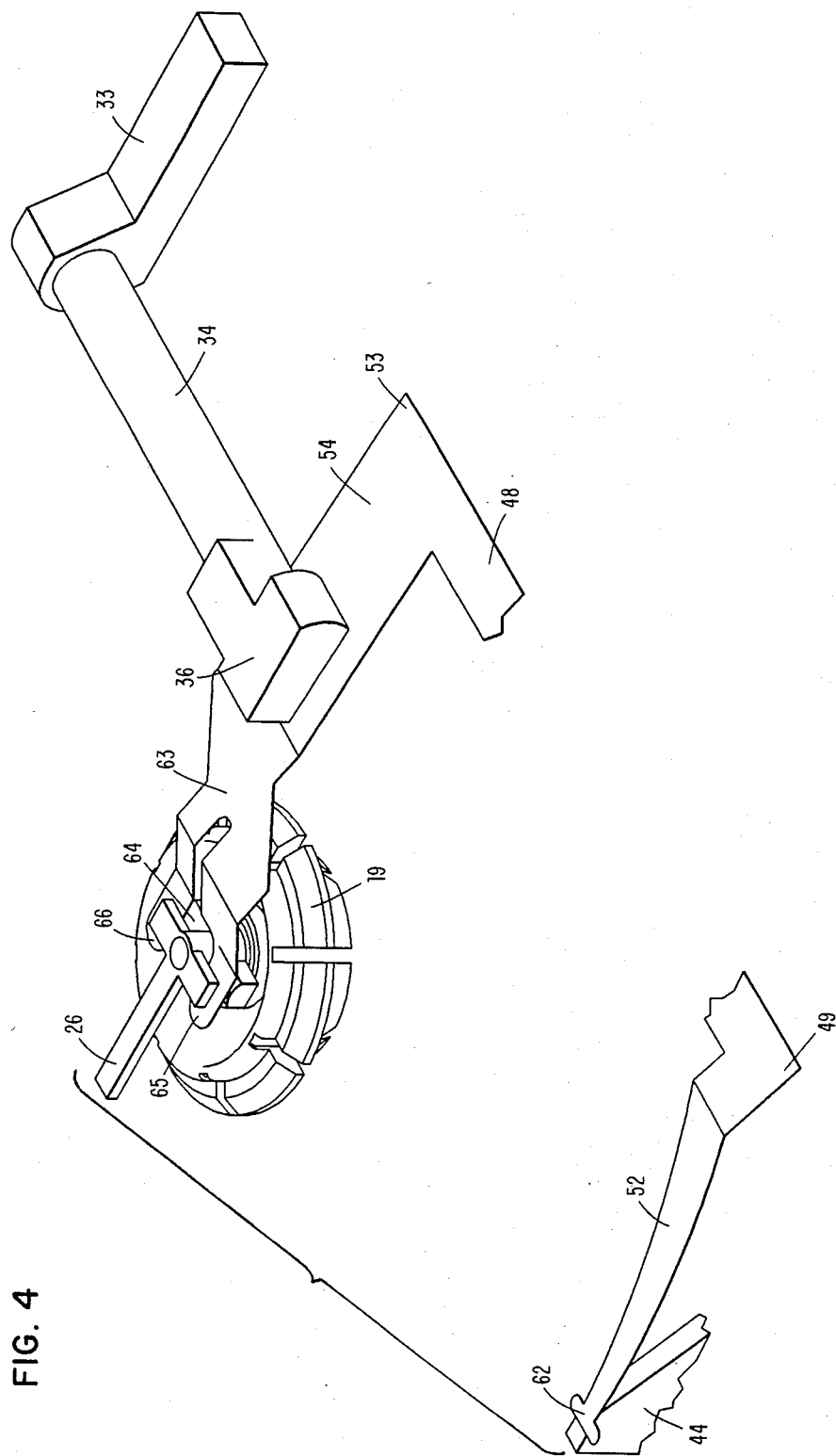
FIG. 4 is a partial schematic view of the camming mechanism and the actuating arm that loads the collet into the spindle.

While a uniform notch 64 could be utilized, it has been found that media slip can be avoided, at least in some disk drives, by configuring notch 64 off-center, as shown best in FIG. 4. By use of an off-center notch, such as is shown in FIG. 4, the force balance is changed between legs 65 and 66 such that they exert equal force on the collet pin and thus avoid a force imbalance, which could cause the collet to precess relative to the spindle and thus cause media slip.

Pressure pad actuating arm 56 also has an inwardly directed notch 68 at the free end to receive pin 29 of pressure pad 28 therein. The free end of recording head actuating arm 58 has a T-shaped portion 70 thereat, which T-shaped portion is received below finger 42 of recording arm 40, which finger extends above the top of the recording head actuating arm.

The arms of actuator 12 are configured as needed to accomplish the desired end. Thus, preload bias arm 52 is deflected with respect to the other arms to provide a preload bias to the torsion beam, while the actuating arms are selectively bent to control the sequence of loading the collet, the cleaning liner (through the pressure pad), and the recording head (through the recording head arm) onto a disk within the disk drive, and the configuration of the collet actuating arm determines the load force exerted on the collet when loaded.

As shown in FIG. 4, cam 36 is in the unloaded condition and this allows the free end of collet actuating arm 54 to be in a lifted position which allows collet 19 to be raised to a position immediately below top plate 14. In this position, the collet is adjacent to the larger diameter portion 24 of collet shaft 23, as best shown in FIG. 3.

When cam 36 is rotated to the loaded condition (i.e., rotated ninety degrees from the position shown in FIGS. 1 through 4) by handle 33, collet actuating arm 54 depresses collet 19 and causes collet 19 to be adjacent to the smaller diameter portion 25 of collet shaft 23.

Figure 5:
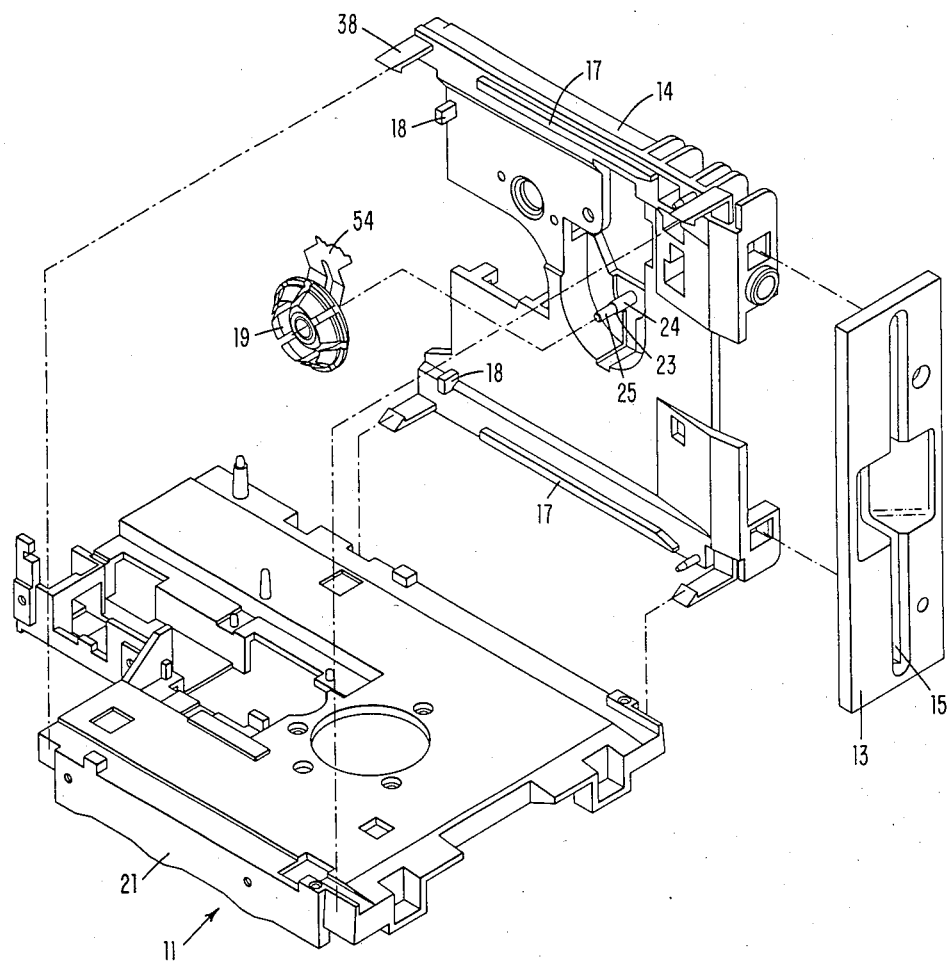
FIG. 5 is an exploded view of the main frame, top plate and front panel of the disk drive, with the under side of the top plate illustrating the diskette cartridge loading guides, rear stops and collet shaft registered in position with respect to each other on the top plate.

In operation, the disk drive is placed in the drive access condition by rotating handle 33 so that it does not cover access slot 15 (i.e., in the position as shown in FIG. 1). In this condition, the collet and recording head are withdrawn so that the disk cartridge can be inserted into the passage 16. A disk cartridge is then inserted into passage 16 through slot 15 so that the cartridge slides rearwardly between guides 17 (see FIG. 5) until the cartridge contacts rear stops 18.

To load the drive (i.e., place the drive in operational condition), handle 33 is then rotated ninety degrees so that cam 36 is rotated ninety degrees which causes collet actuating arm 54 to be depressed to lower collet 19.

While collet 19 is adjacent to the larger diameter portion 25 of collet shaft 23, the first colleting operation is carried out. During this first colleting operation, with the cartridge positioned relative to the collet due to the guides and stops which are positioned on the top plate (as is the collet), the collet penetrates the central aperture in the disk within the cartridge.

As the collet is moved downwardly by the collet actuating arm 56 to a point where the collet is adjacent to the smaller diameter portion 25 of collet shaft 23, the second colleting operation is carried out. During the second colleting operation, the collet can move in a direction horizontally, or normal (i.e., perpendicular), to the vertically positioned spindle axis (since the collet is now adjacent to the reduced diameter portion of the collet shaft) and this allows lateral movement of the collet, as the collet moves into the spindle recess, so that the collet aligns itself with the spindle axes. At this time, the disk is enclamped aligned with the spindle axis and the flexible disk drive is now ready for operation.

As can be appreciated from the foregoing, this invention provides an improved two stage colleting operation that assures alignment of the spindle axis with the disk by means of simplified structure and method.

What is claimed is:

1. In a flexible disk drive having a frame for receiving a cartridge with a flexible disk therein, with said cartridge and said flexible disk each having a central aperture therein, apparatus for precisely centering and clamping the flexible disk to the spindle of the disk drive, said apparatus comprising:
    a collet shaft extending from said frame, said shaft having a first portion adjacent to said frame and having a second portion outwardly from said first portion with the diameter of said second portion being less than that of said first portion;
    a collet slidably mounted on said collet shaft, said collet being substantially constrained from lateral movement while adjacent to said first portion of said collet shaft; and
    actuating means for causing said collet to be moved from a first position adjacent to the first portion of said collet shaft to a second position adjacent to the second portion of said collet shaft, said collet penetrating the central aperture of said flexible disk and engaging said spindle for centering and clamping said flexible disk to the spindle during said movement of said collet from said first position to said second position, and said collet being moveable laterally with respect to the axis of said spindle while adjacent to said second portion of said collet shaft to thereby precisely center said disk with respect to said spindle axis.

2. The apparatus of claim 1 wherein said collet shaft extends downwardly from said frame, and wherein said actuating means causes said collet to be moved downwardly to load said disk drive by centering and clamping said disk to said spindle.

3. In a flexible disk drive that reads and writes signals on a flexible disk inside a cartridge with the flexible disk and cartridge each having a central aperture, and with each cartridge being interchangeable with other cartridges for use in the drive, apparatus for centering and clamping the disk to a spindle that rotates the disk during read and write operations, said apparatus comprising:
    means for guiding each cartridge into the drive during insertion of said cartridge into the drive;
    a collet shaft, the axis of which is in a predetermined position relative to said guiding means;
    a collet slidably mounted on a collet shaft;
    means for sliding said collet with respect to said collet shaft so that said collet is moved toward said spindle with said collet penetrating the central aperture in said flexible disk within said cartridge to thereby engage said spindle to center and clamp of said flexible disk to said spindle;
    said collet shaft having a first diameter to constrain lateral movement of said collet during the first portion of its travel towards said spindle whereby said collet is precisely positioned relative to said cartridge as said collet penetrates the central aperture of said flexible disk within said cartridge; and
    said collet shaft having a second diameter less than that of said first diameter to allow lateral movement of said collet relative to said spindle axis during the last portion of collet travel toward said spindle whereby said collet and said flexible disk penetrated by said collet are precisely positioned to the axis of said spindle as said collet engages said spindle.

4. The apparatus of claim 3 wherein said guide means includes a pair of guide rails and rear stops for determining the positioning of said cartridge within said drive.

5. The apparatus of claim 3 wherein said drive includes a frame, and wherein said first diameter of said collet shaft is adjacent to said frame.

6. The apparatus of claim 3 therein said collet shaft is vertically positioned so that said collet is moved downwardly to a position adjacent to said second diameter portion of said collet shaft.

* * * * *